(12) United States Patent
Nelson et al.

(10) Patent No.: US 10,941,844 B2
(45) Date of Patent: Mar. 9, 2021

(54) TORQUE CONVERTER CLUTCH ASSEMBLY

(71) Applicant: Schaeffler Technologies AG & Co. KG, Herzogenaurach (DE)

(72) Inventors: Kyle Nelson, Wadsworth, OH (US); Victor Norwich, Wooster, OH (US)

(73) Assignee: Schaaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/877,638

(22) Filed: May 19, 2020

(65) Prior Publication Data
US 2020/0370631 A1 Nov. 26, 2020

Related U.S. Application Data

(60) Provisional application No. 62/852,210, filed on May 23, 2019.

(51) Int. Cl.
*F16H 45/02* (2006.01)

(52) U.S. Cl.
CPC ..... *F16H 45/02* (2013.01); *F16H 2045/0205* (2013.01); *F16H 2045/0215* (2013.01); *F16H 2045/0252* (2013.01)

(58) Field of Classification Search
CPC ............. F16H 45/02; F16H 2045/0205; F16H 2045/0215; F16H 2045/0252
See application file for complete search history.

(56) References Cited

U.S. PATENT DOCUMENTS

| | | | |
|---|---|---|---|
| 8,967,349 B2 * | 3/2015 | Ushio | F16D 33/18 192/3.29 |
| 9,309,956 B2 | 4/2016 | Lindemann et al. | |
| 9,494,221 B2 | 11/2016 | Lindemann et al. | |
| 9,677,654 B2 | 6/2017 | Jewell | |
| 9,810,302 B2 | 11/2017 | Sayre et al. | |
| 10,288,158 B2 * | 5/2019 | Saka | F16F 15/145 |
| 2009/0127050 A1 * | 5/2009 | Ari | F16H 45/02 192/3.29 |
| 2015/0337935 A1 | 11/2015 | Matsuoka | |
| 2016/0116044 A1 | 4/2016 | Frait et al. | |

FOREIGN PATENT DOCUMENTS

| | | |
|---|---|---|
| JP | 2013-256986 A | 12/2013 |
| KR | 10-2019-0024427 A | 3/2019 |
| WO | 2019-089200 A1 | 5/2019 |

* cited by examiner

*Primary Examiner* — Tinh Dang
(74) *Attorney, Agent, or Firm* — LeKeisha M. Suggs

(57) ABSTRACT

A torque converter comprises a cover arranged to receive torque, an impeller including an impeller shell fixed to the cover, and a turbine fluidly coupled to the impeller. A lock-up clutch is provided that includes a dam plate non-rotatably connected to the cover, and a piston plate disposed, at least partially, between the cover and the dam plate. A fluid diversion plate is disposed between the dam plate and the turbine, wherein the dam plate is connected to the piston plate on a first axial side and connected to the fluid diversion plate on a second axial side, opposite the first axial side, via a single connector.

17 Claims, 1 Drawing Sheet

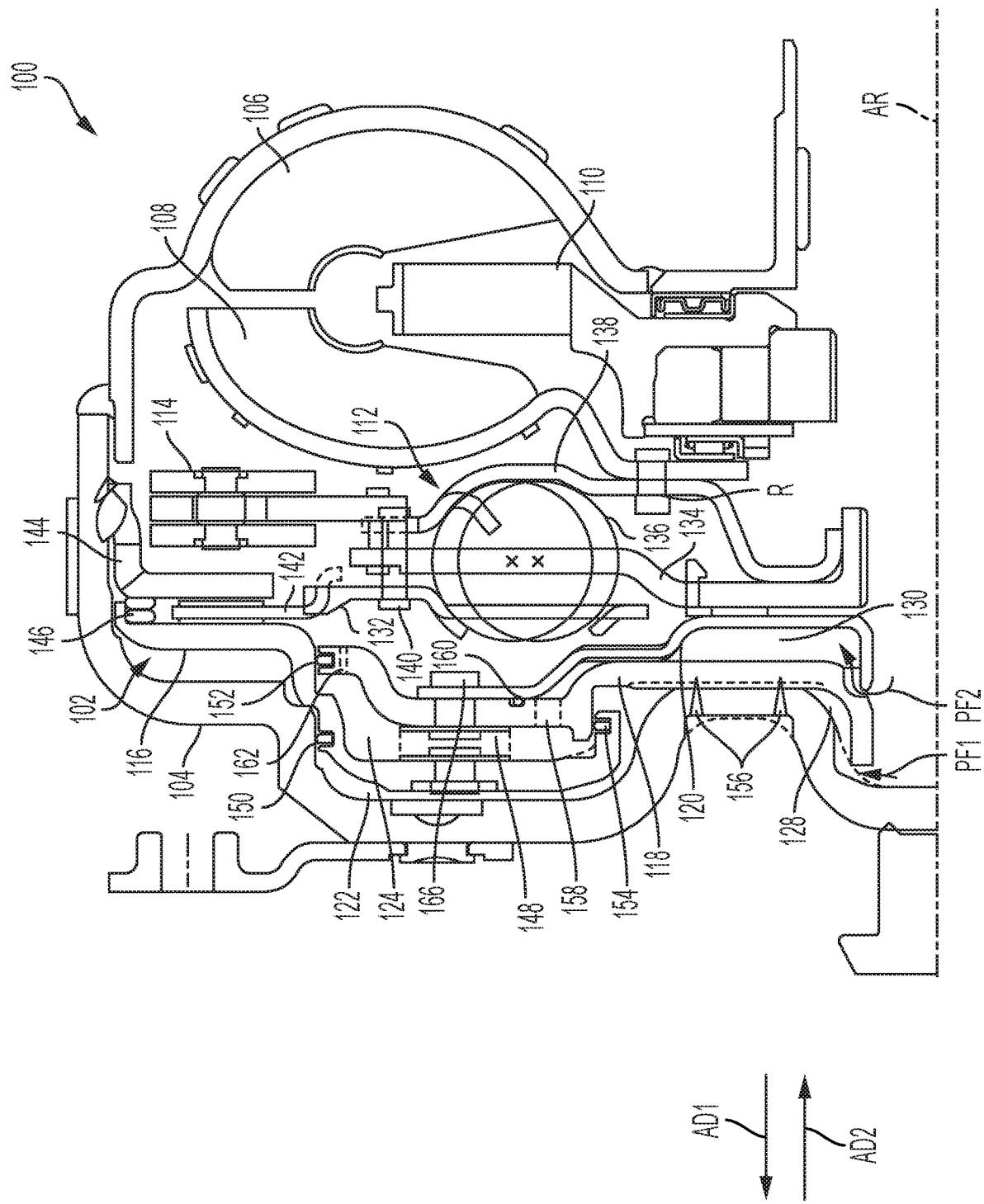

TORQUE CONVERTER CLUTCH ASSEMBLY

CROSS-REFERENCE TO RELATED APPLICATIONS

This application claims the benefit of U.S. Provisional Patent Application No. 62/852,210, filed May 23, 2019, the disclosure of which is incorporated in its entirety by reference herein.

TECHNICAL FIELD

The present disclosure relates generally to a torque converter, and more specifically to a four-pass torque converter with stacked plates forming at least portions of chambers for a lock-up clutch and at least portions of channels for transmitting fluid to and from the chambers.

BACKGROUND

In general, it is known to use large hubs with drilled passages, sometimes overlapping axially, to transmit fluid to and from chambers for a torque converter lock-up clutch. In addition, these types of torque converters typically require many processing and assembly steps, along with complex components to properly function. With this comes significant costs in processing parts, which are necessary to typically be stamped, machined, riveted, and welded. Accordingly, there is a need to simplify the complexity of the design and assembly of these torque converters.

SUMMARY

According to embodiments, a torque converter comprises a cover arranged to receive torque, an impeller including an impeller shell fixed to the cover, and a turbine fluidly coupled to the impeller. A lock-up clutch is provided that includes a dam plate non-rotatably connected to the cover, and a piston plate disposed, at least partially, between the cover and the dam plate. A fluid diversion plate is disposed between the dam plate and the turbine, wherein the dam plate is connected to the piston plate on a first axial side and connected to the fluid diversion plate on a second axial side, opposite the first axial side, via a single connector.

The torque converter may include an apply chamber bounded at least in part by the cover and the piston plate and arranged to receive a first fluid to axially displace the piston plate to close the lock-up clutch. A balance chamber is bounded at least in part by the piston and the dam plate and arranged to receive a second fluid to balance the first fluid in the apply chamber. The lock-up clutch may further include a first channel connected to the apply chamber and bounded at least in part by the cover and the dam plate and arranged to route the first fluid from a first fluid circuit to the apply chamber. A second channel may be connected to the balance chamber and bounded at least in part by the dam plate and the fluid diversion plate and arranged to route the second fluid from a second fluid circuit to the balance chamber.

In embodiments, the dam plate includes an opening defined therein and arranged to permit the second fluid to be routed from the second channel through the opening into the balance chamber. The fluid diversion plate is sealed to the dam plate via a seal, wherein the seal is disposed radially outward of the opening in the dam plate and disposed radially inward of the connector. The piston plate is sealed to the cover via a first seal and sealed to an outer diameter of the dam plate via a second seal, wherein the first seal and the second seal are disposed at a same radial distance from an axis of rotation. Moreover, the piston plate may be sealed at an inner diameter thereof to the dam plate and the single connector may be a rivet.

In other embodiments, a torque converter comprises a cover arranged to receive torque, an impeller including an impeller shell fixed to the cover, a turbine fluidly coupled to the impeller, and a lock-up clutch. The lock-up clutch may include a dam plate non-rotatably connected to the cover, a piston plate disposed, at least partially, between the cover and the dam plate and connected to the dam plate via a connector, and a fluid diversion plate disposed between the dam plate and the turbine. The fluid diversion plate is connected to the dam plate via the connector, wherein: a first chamber is formed at least in part by the cover and the piston plate and arranged to receive a first fluid to axially displace the piston plate to close the lock-up clutch; and a second chamber is formed at least in part by the piston and the dam plate and arranged to receive a second fluid to balance the first fluid in the apply chamber.

In embodiments, the lock-up clutch further includes: a first channel connected to the first chamber and bounded at least in part by the cover and the dam plate and arranged to route the first fluid from a first fluid circuit to the first chamber; and a second channel connected to the second chamber and bounded at least in part by the dam plate and the fluid diversion plate and arranged to route the second fluid from a second fluid circuit to the second chamber. A leaf spring may be disposed between the piston plate and the dam plate and connected therebetween via the connector. The lock-up clutch may further include: a reaction plate fixed to the cover; a clutch plate disposed axially between the piston plate and the reaction plate; and a return spring disposed between the piston plate and the reaction plate, wherein the return spring is configured to bias the lock-up clutch in an open position. The return spring is disposed radially outside of the clutch plate. The torque converter may further include a damper assembly including an input plate, wherein the clutch plate is connected to the input plate.

Embodiments according to this disclosure provide several advantages such as reducing design complexity and costs through elimination of a welding operation by assigning the existing connectors, e.g., rivets, for clutch torque transmission the duty to also hold a plate to guide flow to the balance chamber, which is now integrated into the centering flange.

BRIEF DESCRIPTION OF THE DRAWINGS

The single FIGURE shows a partial cross-sectional view of a torque converter according to embodiments of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs.

The single figure shows a partial cross-sectional view of torque converter 100. Torque converter 100 includes: lock-up clutch 102; cover 104 arranged to receive torque; impeller 106; turbine 108; stator 110; torsional vibration damper 112; and centrifugal pendulum absorber 114. Lock-up clutch 102 includes: piston plate 116; dam plate 118 non-rotatably connected to cover 104; fluid diversion plate 120 axially disposed between dam plate 118 and turbine 108; apply chamber 122 bounded at least in part by cover 104 and piston plate 116; balance chamber 124 bounded at least in part by piston plate 116 and dam plate 126; channel 128 connected to apply chamber 122 and bounded at least in part by cover 104 and dam plate 118; and channel 130 connected to balance chamber 124 and bounded at least in part by dam plate 118 and fluid diversion plate 120.

In one embodiment, damper 112 is arranged to be non-rotatably connected to an input shaft (not shown) of a transmission (not shown). Damper 112 includes: input plate 132; output flange 134 arranged to non-rotatably connect to the input shaft; at least one spring 136 engaged with input plate 132 and output flange 134; and cover plate 138 engaged with springs 136 and non-rotatably connected to input plate 132, for example by rivets 140. Cover plate 138 may be connected to centrifugal pendulum absorber 114 via rivets 140. Damper 112 is connected to turbine 108. That is, cover plate 138 of damper 112 may be connected to turbine 108 via rivet R.

Clutch 102 further includes clutch plate 142 non-rotatably connected to input plate 132, reaction plate 144 fixed to cover 104, and clutch return spring 146. Clutch return spring 146 is disposed radially outside of clutch plate 142 and arranged to bias clutch 102 in an open position for a torque converter mode of operation. Channel 128 is arranged to transmit pressurized fluid PF1 to apply chamber 122 to axially displace piston plate 116 to non-rotatably connect piston plate 116, clutch plate 142, and reaction plate 144 for a lock-up mode of torque converter 100. That is, for the lock-up mode, fluid PF1 overcomes the force of clutch return spring 146, and piston plate 116 displaces in direction AD2, opposite axial direction AD1. For a torque converter mode of torque converter 100, fluid PF1 is drained from apply chamber 122 or de-pressurized in apply chamber 122 such that the force of the clutch return spring 146 is able to displace piston plate 116 in direction AD1 and disengage piston plate 116 from clutch plate 142. Torque converter 100 further includes leaf springs 148 connecting piston plate 116 to dam plate 118 via connector 166, which may be a rivet.

In the example of the figure, pressurized fluid PF2 is transmitted to balance chamber 124 to dynamically balance torque converter 100, in particular to dynamically balance fluid PF1 in apply chamber 122. Fluid PF2 reaches balance chamber 124 typically via a side drilled hole in the input shaft, and fluid flows through channel 130 between dam plate 118 and fluid diversion plate 120, up past the piston inner diameter (ID) seal 154, and through hole or opening 158 in dam plate 118 to balance chamber 124. Channels 128 and 130 form separate fluid circuits in torque converter 100. Pressurized fluid PF1 and PF2 are transmitted through respective separate channels in the input shaft to channels 128 and 130. In the example of the figure, torque converter 100 is a four-pass, or four fluid circuit, torque converter.

Piston plate 116 is sealed to cover 104 by seal 150 and sealed to dam plate 118 outer diameter by seal 152. Seal 150 and seal 152 may be disposed at the same or equal radial distance from axis of rotation AR. Piston 116 inner diameter is sealed to dam plate 118 by seal 154. Piston 116 is configured to transmit torque via leaf spring 148 to dam plate 118, wherein dam plate 118 is rigidly connected to cover 104 via welds 156. Welds 156 may be intermittent laser welded connections. Dam plate 118 further includes balance chamber opening 162.

Fluid diversion plate 120 is sealed to the dam plate 118, for example, in this particular case with a face seal 160 via an O-ring. However, it is to be understood that any other method of sealing could be used (i.e., a gasket). Fluid diversion plate 120 is fixed to dam plate 118 with the connector, e.g., rivet, 166 utilized in the leaf spring connection 148. That is, piston 116, dam plate 118, and fluid diversion plate 120 are connected together via connector or rivet 166. In other four-pass designs, this plate would typically be laser welded, which is an additional operation. Accordingly, embodiments of the present disclosure provide a connection of fluid diversion plate 120 using the riveted connection rather than a weld, saving on cost of additional processing. Moreover, fluid diversion plate 120 serves to direct fluid from the input shaft to the balance chamber for proper four-pass function, and in this case, act as a spacer plate for converter thrusting. The riveting of this plate in combination with the clutch leaf springs eliminates the necessity of a laser lap weld in the design, and potentially allows for an overall mass reduction/material cost savings by combining the outer portion of the dam plate with the centering flange (that is typically used), both of which are typically a thicker material for durability, and a thinner plate to direct fluid.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 lock-up clutch
104 cover
106 impeller
108 turbine
110 stator
112 torsional vibration damper
114 centrifugal pendulum absorber
116 piston plate
118 dam plate
120 fluid diversion plate
122 chamber
124 balance chamber
126 dam plate
128 channel
130 channel
132 input plate
134 output flange
136 springs
138 plate
140 rivets
142 clutch plate
144 reaction plate
146 clutch return spring
148 leaf springs
150 seal
152 seal
154 seal
156 welds
158 opening
160 seal
162 balance chamber opening
166 connector

What is claimed is:

1. A torque converter, comprising:
a cover arranged to receive torque;
an impeller including an impeller shell fixed to the cover;
a turbine fluidly coupled to the impeller; and
a lock-up clutch including:
   a dam plate non-rotatably connected to the cover;
   a piston plate disposed, at least partially, between the cover and the dam plate; and
   a fluid diversion plate disposed between the dam plate and the turbine, wherein the dam plate is connected to the piston plate on a first axial side and connected to the fluid diversion plate on a second axial side, opposite the first axial side, via a single connector.

2. The torque converter as claimed in claim 1, further comprising:
an apply chamber bounded at least in part by the cover and the piston plate and arranged to receive a first fluid to axially displace the piston plate to close the lock-up clutch; and
a balance chamber bounded at least in part by the piston plate and the dam plate and arranged to receive a second fluid to balance the first fluid in the apply chamber.

3. The torque converter as claimed in claim 2, wherein the lock-up clutch further includes:
a first channel connected to the apply chamber and bounded at least in part by the cover and the dam plate and arranged to route the first fluid from a first fluid circuit to the apply chamber; and
a second channel connected to the balance chamber and bounded at least in part by the dam plate and the fluid diversion plate and arranged to route the second fluid from a second fluid circuit to the balance chamber.

4. The torque converter as claimed in claim 3, wherein the dam plate includes an opening defined therein and arranged to permit the second fluid to be routed from the second channel through the opening into the balance chamber.

5. The torque converter as claimed in claim 4, wherein the fluid diversion plate is sealed to the dam plate via a seal.

6. The torque converter as claimed in claim 5, wherein the seal is disposed radially outward of the opening in the dam plate.

7. The torque converter as claimed in claim 5, wherein the seal is disposed radially inward of the connector.

8. The torque converter as claimed in claim 1, wherein the piston plate is sealed to the cover via a first seal and sealed to an outer diameter of the dam plate via a second seal.

9. The torque converter as claimed in claim 8, wherein the first seal and the second seal are disposed at a same radial distance from an axis of rotation.

10. The torque converter as claimed in claim 1, wherein the piston plate is sealed at an inner diameter thereof to the dam plate.

11. The torque converter as claimed in claim 1, wherein the single connector is a rivet.

12. A torque converter, comprising:
a cover arranged to receive torque;
an impeller including an impeller shell fixed to the cover;
a turbine fluidly coupled to the impeller; and
a lock-up clutch including:
   a dam plate non-rotatably connected to the cover;
   a piston plate disposed, at least partially, between the cover and the dam plate and connected to the dam plate via a connector; and
   a fluid diversion plate disposed between the dam plate and the turbine and connected to the dam plate via the connector,
   wherein:
      a first chamber is formed at least in part by the cover and the piston plate and arranged to receive a first fluid to axially displace the piston plate to close the lock-up clutch; and
      a second chamber is formed at least in part by the piston plate and the dam plate and arranged to receive a second fluid to balance the first fluid in the first chamber.

13. The torque converter as claimed in claim 12, wherein the lock-up clutch further includes:
a first channel connected to the first chamber and bounded at least in part by the cover and the dam plate and arranged to route the first fluid from a first fluid circuit to the first chamber; and
a second channel connected to the second chamber and bounded at least in part by the dam plate and the fluid diversion plate and arranged to route the second fluid from a second fluid circuit to the second chamber.

14. The torque converter as claimed in claim 12, further including a leaf spring disposed between the piston plate and the dam plate and connected therebetween via the connector.

15. The torque converter as claimed in claim 12, wherein the lock-up clutch further includes:
- a reaction plate fixed to the cover;
- a clutch plate disposed axially between the piston plate and the reaction plate; and
- a return spring disposed between the piston plate and the reaction plate, wherein the return spring is configured to bias the lock-up clutch in an open position.

16. The torque converter as recited in claim 15, wherein the return spring is disposed radially outside of the clutch plate.

17. The torque converter as recited in claim 15, further comprising a damper assembly including an input plate, wherein the clutch plate is connected to the input plate.

\* \* \* \* \*